United States Patent
Hasegawa et al.

(10) Patent No.: US 9,229,166 B2
(45) Date of Patent: Jan. 5, 2016

(54) OPTICAL FIBER CUTTER, AND OPTICAL FIBER CUTTER UNIT

(75) Inventors: Masahiro Hasegawa, Yokohama (JP); Tsuyoshi Tada, Yokohama (JP); Toshihiko Homma, Yokohama (JP)

(73) Assignees: SEI Optifrontier Co., Ltd., Yokohama-shi, Kanagawa (JP); SUMITOMO ELECTRIC INDUSTRIES, LTD., Osaka-shi, Osaka (JP)

(*) Notice: Subject to any disclaimer, the term of this patent is extended or adjusted under 35 U.S.C. 154(b) by 0 days.

(21) Appl. No.: 13/991,759

(22) PCT Filed: Aug. 3, 2012

(86) PCT No.: PCT/JP2012/069897
§ 371 (c)(1), (2), (4) Date: Jun. 5, 2013

(87) PCT Pub. No.: WO2013/024722
PCT Pub. Date: Feb. 21, 2013

(65) Prior Publication Data
US 2013/0255084 A1    Oct. 3, 2013

(30) Foreign Application Priority Data

Aug. 12, 2011 (JP) ................ 2011-176988

(51) Int. Cl.
*G02B 6/25* (2006.01)

(52) U.S. Cl.
CPC .............. *G02B 6/25* (2013.01); *Y10T 83/0393* (2015.04)

(58) Field of Classification Search
CPC ........ G02B 6/25; B26D 5/08; E05D 11/1007; B26F 1/36
USPC ........... 83/584, 588, 586, 587, 601, 613, 614, 83/697, 699.31, 944, 471, 471.3; 225/4, 225/103
See application file for complete search history.

(56) References Cited

U.S. PATENT DOCUMENTS

| 514,236 A | * | 2/1894 | Moonelis | 83/92 |
| 2,255,846 A | * | 9/1941 | Grammer | 83/582 |

(Continued)

FOREIGN PATENT DOCUMENTS

| EP | 1 734 387 | 12/2006 |
| JP | H4-506185 | 10/1992 |

(Continued)

OTHER PUBLICATIONS

English-language Translation of International Preliminary Report on Patentability (IPRP) dated Feb. 27, 2014 in International Application No. PCT/JP2012/069897.

*Primary Examiner* — Sean Michalski
*Assistant Examiner* — Jonathan G Riley
(74) *Attorney, Agent, or Firm* — Drinker Biddle & Reath LLP

(57) ABSTRACT

The optical fiber cutter 1 comprises a cutter base 3 and a cutter lid 4 attached openably and closably to the cutter base 3. A slider 8 having a blade member for incising an optical fiber is attached to the cutter base 3 so as to be movable widthwise. A switching plate 15 is attached to a rear end part of the cutter base 3, while a switcher 16 is provided on the outer surface side of the switching plate 15. When the switcher 16 is at a first position, the cutter lid 4 engages a stopper, thereby attaining an opening angle of 35°. When the switcher 16 is at a second position, the engagement between the cutter lid 4 and the stopper is released, whereby the cutter lid 4 attains an opening angle of 70°.

3 Claims, 16 Drawing Sheets

(56) References Cited

U.S. PATENT DOCUMENTS

| | | | |
|---|---|---|---|
| 3,744,085 A * | 7/1973 | Griego | 16/325 |
| 4,340,992 A * | 7/1982 | Lombardi | 16/349 |
| 4,594,927 A * | 6/1986 | Mori | 83/620 |
| 5,031,321 A * | 7/1991 | Briscoe | 30/134 |
| 5,038,650 A * | 8/1991 | Hodge | 83/471.3 |
| 5,046,252 A * | 9/1991 | Ayuta et al. | 30/258 |
| 5,715,880 A * | 2/1998 | Tucker et al. | 144/286.1 |
| 5,901,449 A * | 5/1999 | Ulbrich et al. | 30/278 |
| 2006/0263028 A1* | 11/2006 | Honma | 385/134 |
| 2010/0163593 A1 | 7/2010 | Song et al. | |

FOREIGN PATENT DOCUMENTS

| | | | |
|---|---|---|---|
| JP | 2000-187120 A | 7/2000 | |
| JP | 2005-301142 | 10/2005 | |
| JP | 2007-194396 A | 8/2007 | |
| JP | 2008-203815 A | 9/2008 | |
| JP | 2010-507830 A | 3/2010 | |
| KR | 10-2006-0125461 | 12/2006 | |
| WO | WO 91/02632 | 3/1991 | |
| WO | WO 9102632 A1 * | 3/1991 | B26F 1/36 |
| WO | WO-2005/088370 A1 | 9/2005 | |

* cited by examiner

Fig.6
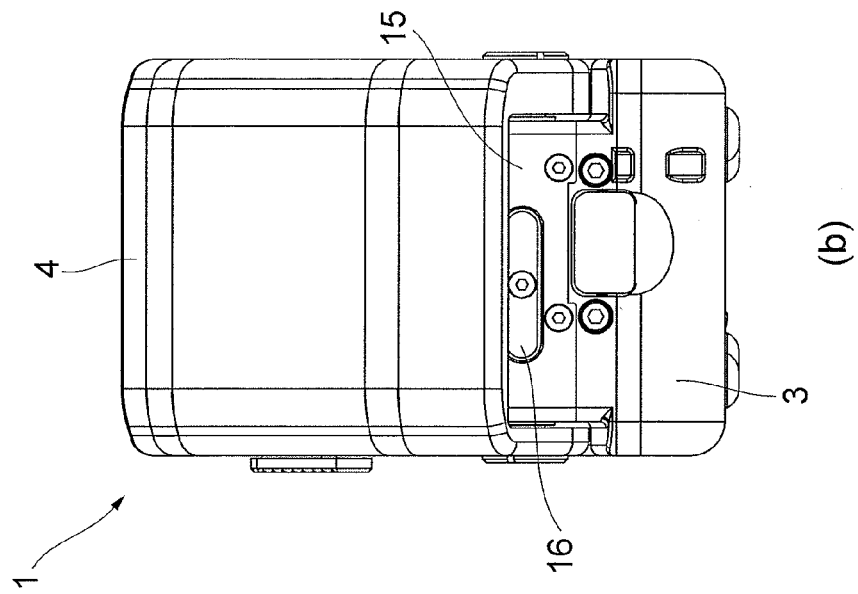
(b)
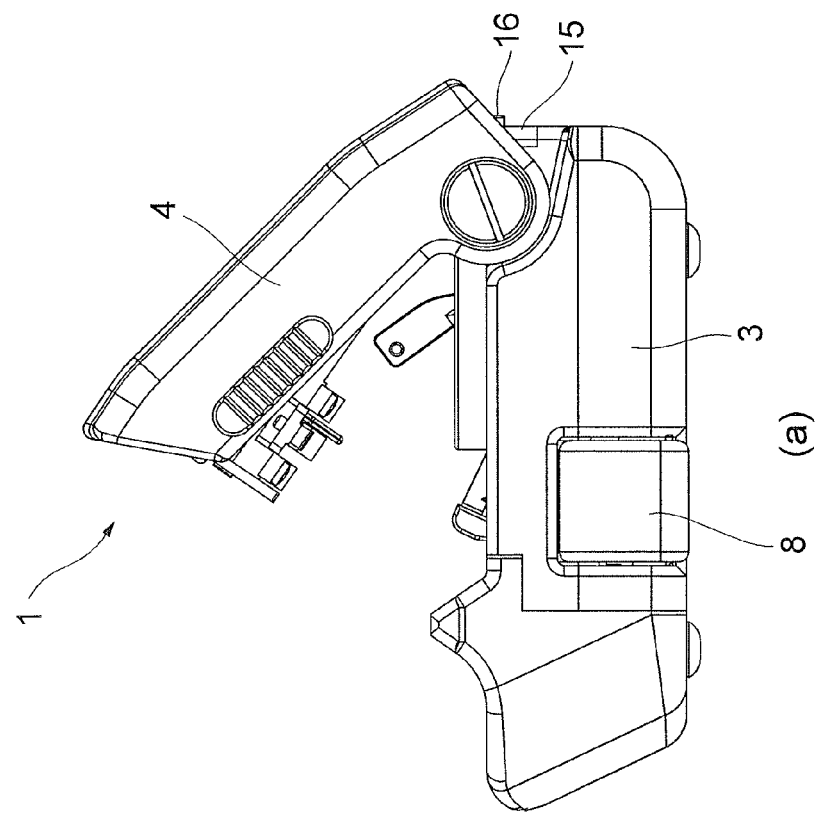
(a)

*Fig.7*
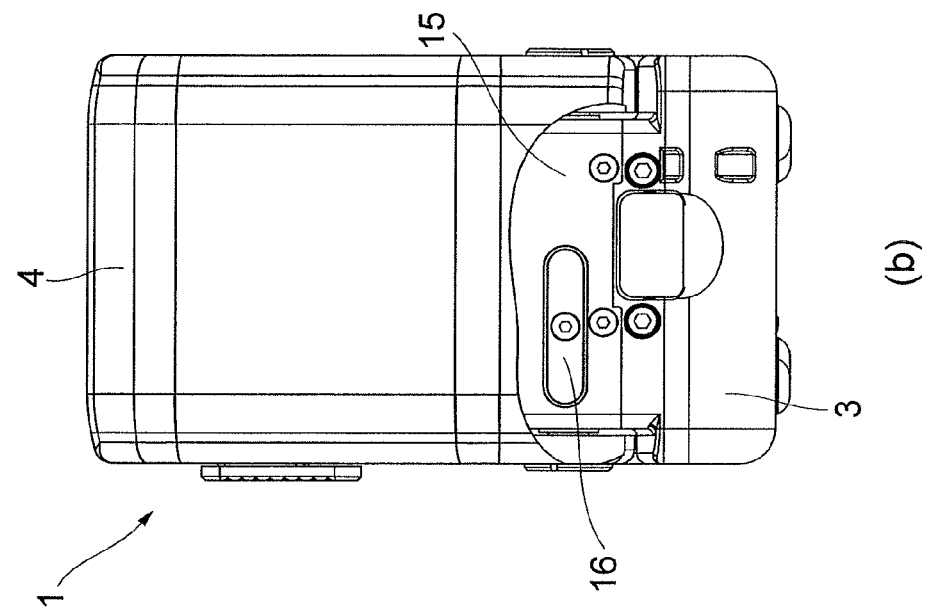
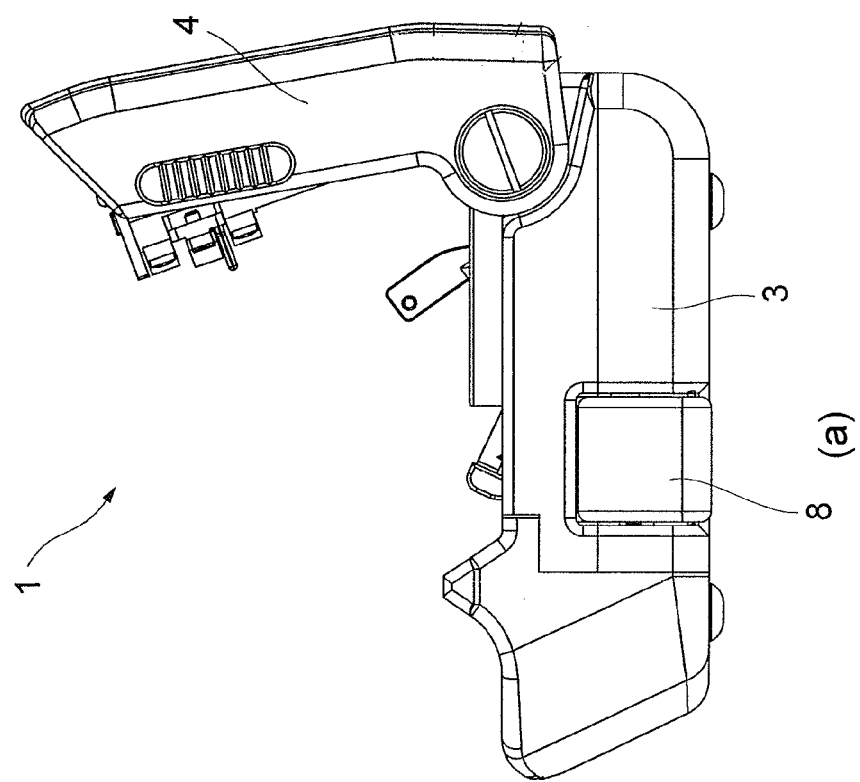

Fig.8
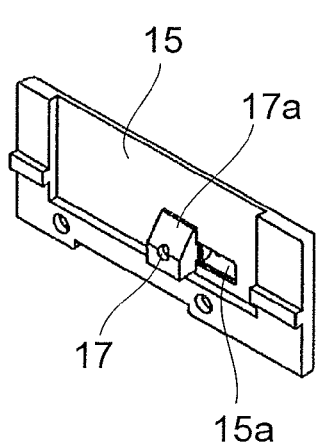
(a)
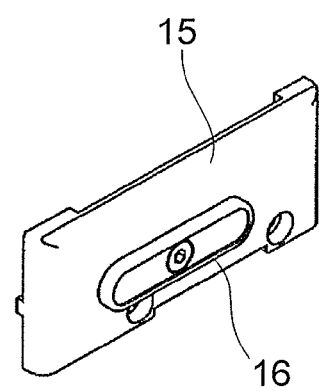
(b)

Fig.9
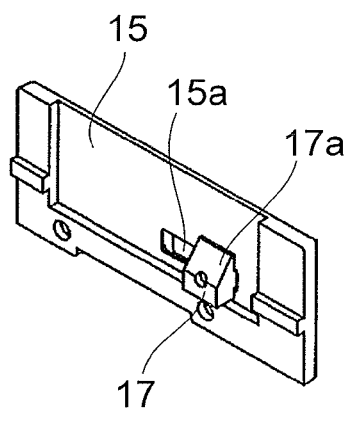
(a)
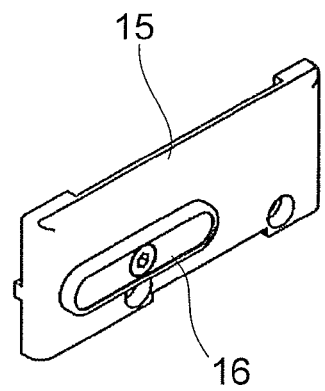
(b)

OPTICAL FIBER CUTTER, AND OPTICAL FIBER CUTTER UNIT

TECHNICAL FIELD

The present invention relates to an optical fiber cutter and optical fiber cut unit for cutting an optical fiber.

BACKGROUND ART

As a conventional optical fiber cutter, one constituted by a lower box (cutter base) equipped with a disk-shaped blade member for incising a glass fiber part of an optical fiber and an upper box (cutter lid) rotatably connected to one end of the lower box with a hinge member has been known as described in Patent Literature 1, for example.

CITATION LIST

Patent Literature

Patent Literature 1: Japanese Patent Application Laid-Open No. 2008-203815

SUMMARY OF INVENTION

Technical Problem

However, the following problem exists in the above-mentioned prior art. When performing an operation for cutting an optical fiber with the optical fiber cutter of the above-mentioned prior art, one hand holds the optical fiber cutter, while the other hand handles the optical fiber and the like in general. In this case, the opening angle of the cutter lid with respect to the cutter base is not so large, since the hand holding the fiber cutter has to close the cutter lid. However, some users perform the operation with the optical fiber placed on a workbench. In this case, unless the opening angle of the cutter lid with respect to the cutter base is large, the optical fiber is hard to set to the optical fiber cutter, which lowers workability.

It is an object of the present invention to provide an optical fiber cutter and an optical fiber cutter unit which can improve workability when performing the operation with the optical fiber cutter either held with a hand or placed on a workbench.

Solution to Problem

The present invention provides an optical fiber cutter for cutting an optical fiber, the optical fiber cutter comprising a cutter base having a fiber guide part for positioning the optical fiber; a slider, movably attached to the cutter base, having a blade member for incising the optical fiber; a cutter lid attached openably and closably to the cutter base and adapted to move the slider back to an initial position when closed with respect to the cutter base; and angle switching means for switching an opening angle of the cutter lid with respect to the cutter base.

When performing an operation for cutting an optical fiber with thus constructed optical fiber cutter of the present invention, the slider is pushed in and moved from the initial position, then the optical fiber is positioned at the fiber guide part of the cutter base, and the cutter lid is closed with respect to the cutter base in this state, so as to move the slider back to the initial position. This causes the blade member provided with the slider to incise the optical fiber, thereby cutting the latter.

Here, the opening angle switching means for switching the opening angle of the cutter lid with respect to the cutter base is provided, so as to switch the opening angle of the cutter lid with respect to the cutter base according to how the operation for cutting the optical fiber is performed. When performing the operation with the optical fiber cutter held with one hand, for example, the opening angle of the cutter lid with respect to the cutter base is set smaller, so as to make it easy for the hand holding the fiber cutter to close the cutter lid, whereby the operation is easier to perform. When performing the operation with the optical fiber cutter placed on a workbench, by contrast, the opening angle of the cutter lid with respect to the cutter base is set greater, so as to make it possible to position the optical fiber at the fiber guide part of the cutter base from above the optical fiber cutter, whereby the operation is easier to perform. Workability is thus improved when performing the operation with the optical fiber cutter either held with one hand or placed on a workbench.

The opening angle switching means may have a switcher provided with the cutter base and a stopper adapted to operate in conjunction with the switcher so as to engage the cutter lid when the switcher is at a predetermined position. In this case, when the switcher is at the predetermined position, the stopper engages the cutter lid, whereby the opening of the cutter lid is restricted by the stopper. When the switcher is switched from the predetermined position to another position, by contrast, the engagement between the stopper and the cutter lid is released, which allows the cutter lid to open more. Hence, the opening angle of the cutter lid with respect to the cutter base can be switched easily and securely.

Here, the opening angle switching means may further have a switching plate arranged at a rear end part of the cutter base, the switcher and the stopper may be attached to the switching plate so as to be movable together widthwise of the cutter base, the switcher may be provided on the outer surface side of the switching plate, and the stopper may be provided on the inner surface side of the switching plate. This can simplify the structure of the opening angle switching means and make it easier to operate the switcher.

The optical fiber cutter unit of the present invention comprises the above-mentioned optical fiber cutter and a base attachment for setting the optical fiber cutter therein.

The optical fiber cutter unit of the present invention is thus equipped with the above-mentioned optical fiber cutter having the opening angle switching means and therefore can improve workability when performing the operation with the optical fiber cutter either held with a hand or placed on a workbench as mentioned above. When performing the operation with the optical fiber cutter placed on the workbench, setting the optical fiber cutter in the base attachment stabilizes the posture of the optical fiber cutter, thereby making it possible to achieve better workability.

The base attachment may be provided with a push lever for pushing the slider in from the initial position. In the state where the optical fiber cutter is set in the base attachment, the slider to be pushed in with a hand is pushed from above or beside the base attachment, which makes it harder to push the slider in. Hence, providing the base attachment with a push lever for pushing the slider in from the initial position allows the push lever to push and move the slider from the initial position easily.

Advantageous Effects of Invention

The present invention can improve workability when performing the operation with the optical fiber cutter either held with a hand or placed on a workbench. This can reduce burdens on operators.

BRIEF DESCRIPTION OF DRAWINGS

FIG. 6 is a set of side and rear views of the optical fiber cutter illustrated in FIG. 1;

FIG. 7 is a set of side and rear views of the optical fiber cutter illustrated in FIG. 5;

FIG. 8 is a set of perspective views illustrating a switching plate depicted in FIG. 6 as seen from the inner and outer surface sides;

FIG. 9 is a set of perspective views illustrating the switching plate depicted in FIG. 7 as seen from the inner and outer surface sides;

DESCRIPTION OF EMBODIMENTS

In the following, preferred embodiments of the optical fiber cutter and optical fiber cutter unit in accordance with the present invention will be explained in detail with reference to the drawings.

Figure 1:
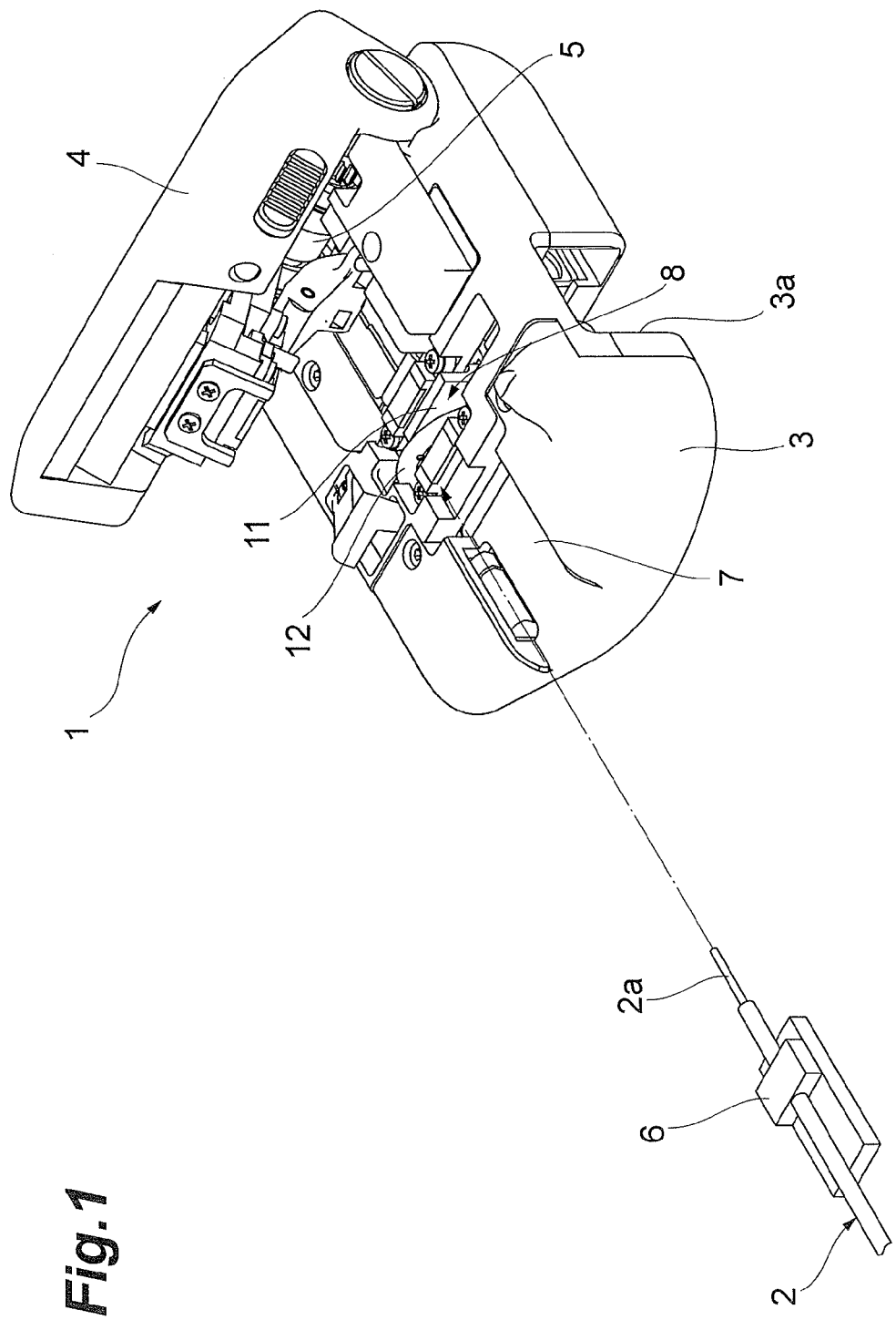
FIG. 1 is a perspective view illustrating an embodiment of the optical fiber cutter in accordance with the present invention.

FIG. 1 is a perspective view illustrating an embodiment of the optical fiber cutter in accordance with the present invention. In this drawing, the optical fiber cutter 1 of this embodiment is one for cutting a glass fiber 2a exposed by removing a coating from a leading end part of an optical fiber 2.

The optical fiber cutter 1 comprises a cutter base 3 and a cutter lid 4 attached openably and closably to the cutter base 3. The cutter lid 4 is rotatably connected to a rear end part of the cutter base 3 with a shaft 5 extending widthwise of the cutter base 3. The upper face of the cutter base 3 is formed with a holder guide part 7 shaped into a substantially rectangular depression for positioning a fiber holder 6 for holding the optical fiber 2 to be cut.

Figure 2:
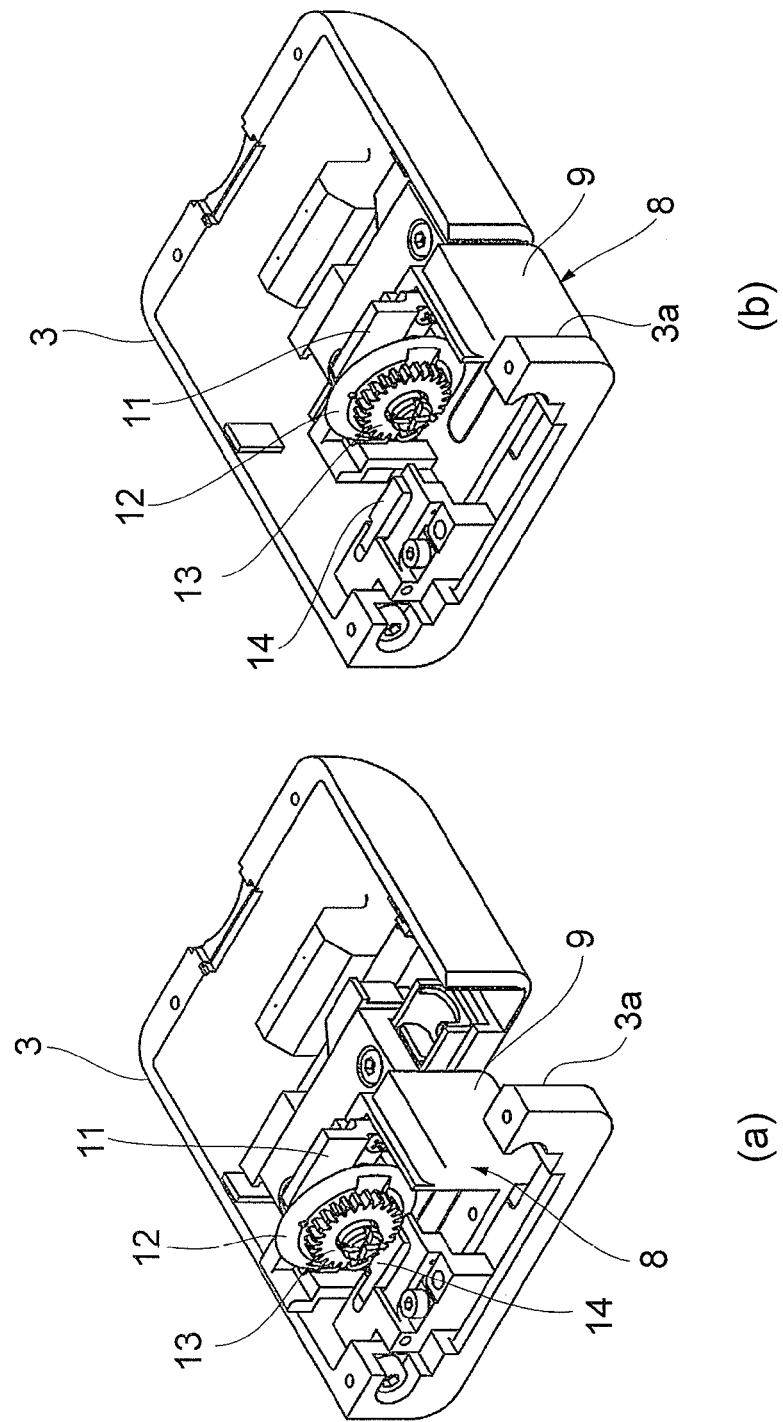
FIG. 2 is a set of perspective views illustrating an inner structure of a cutter base depicted in FIG. 1.
Figure 3:
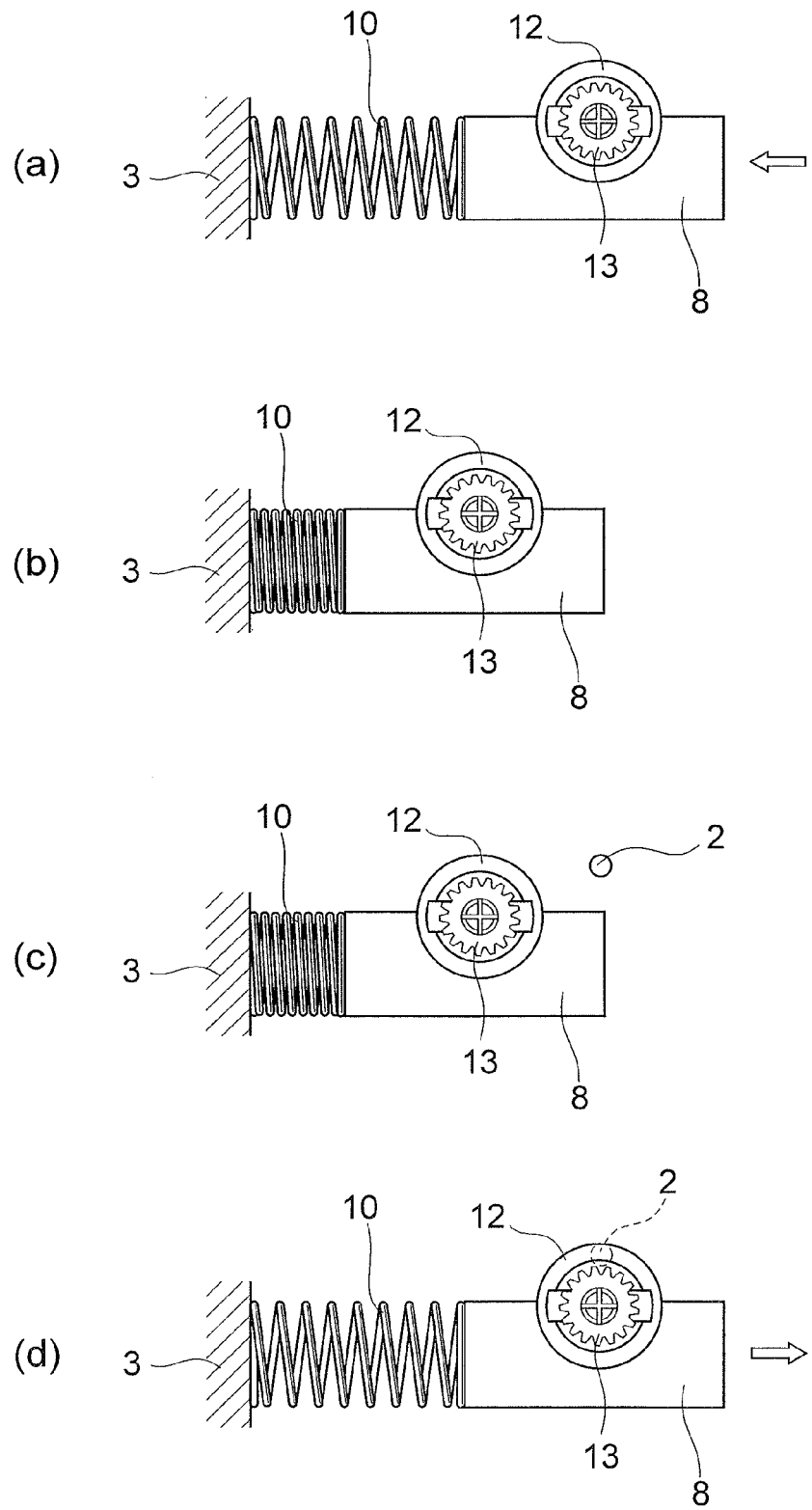
FIG. 3 is a set of conceptual views illustrating how the optical fiber cutter illustrated in FIG. 1 incises an optical fiber.

A slider 8 is attached to the cutter base 3 on the rear side (shaft 5 side) of the holder guide part 7. As illustrated in FIG. 2, the slider 8 is movable widthwise of the cutter base 3. One end part of the slider 8 is provided with a pushing wall 9. One side wall of the cutter base 3 is formed with an opening 3a for exposing the pushing wall 9. A spring 10 (see FIG. 3) for urging the slider 8 toward the opening 3a is provided between the other end part of the slider 8 and the other side wall of the cutter base 3. Under the urging force of the spring 10, the slider 8 is usually at an initial position illustrated in FIG. 2(b).

A support wall 11 for the slider 8 rotatably supports a disk-shaped blade member 12 for incising the glass fiber 2a of the optical fiber 2. A circular gear 13 is attached to the blade member 12, so that the blade member 12 and the gear 13 are rotatable as a unit. At a part of the cutter base 3 on the side opposite from the opening 3a, an arm member 14 adapted to engage the gear 13 is provided.

When performing an operation for cutting the optical fiber 2 with thus constructed optical fiber cutter 1, the pushing wall 9 of the slider 8 is initially pushed in as illustrated in FIG. 3(a) while the cutter lid 4 is open with respect to the cutter base 3. Then, as illustrated in FIGS. 2(a) and 3(b), the slider 8 moves to the opposite side of the opening 3a against the urging force of the spring 10, so as to reach a cut start position. Here, an engagement structure (not depicted) provided with the cutter base 3 holds the slider 8 at the cut start position.

The arm member 14 engages the gear 13, so that the gear 13 rotates by a predetermined amount, with which the blade member 12 rotates by a predetermined amount. Hence, the part of the blade member 12 coming into contact with the optical fiber 2 shifts by a predetermined amount every time the slider 8 reaches the cut start position. This can lengthen the life of the blade member 12.

In this state, the fiber holder 6 holding the optical fiber 2 is set into the holder guide part 7 of the cutter base 3 as illustrated in FIG. 1. This places the optical fiber 2 into a state positioned with respect to the slider 8 as illustrated in FIG. 3(c).

Figure 4:
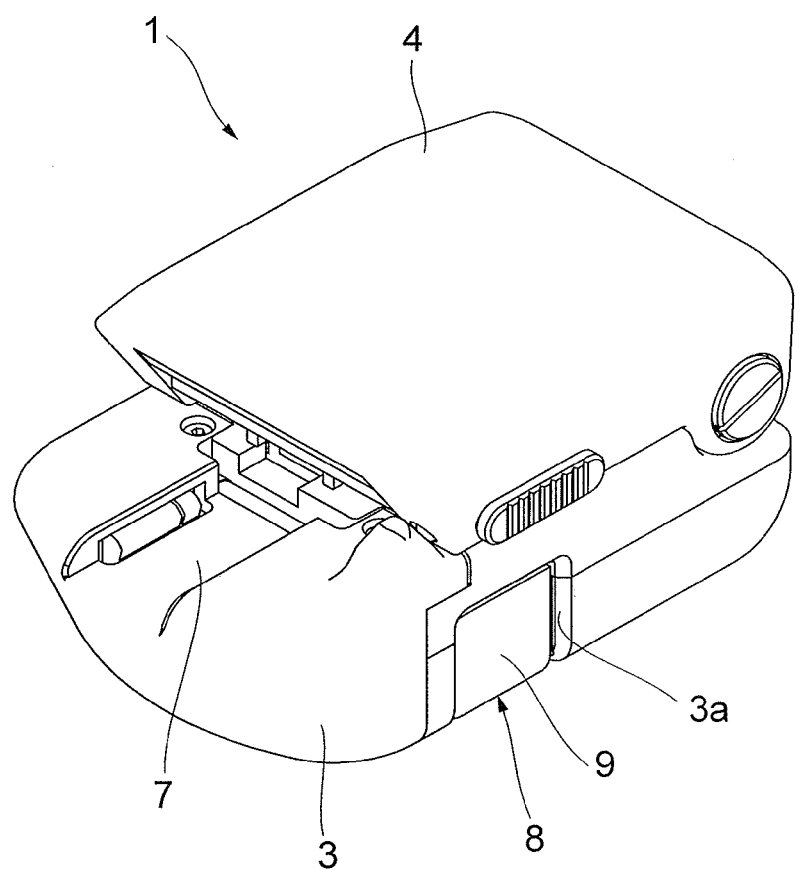
FIG. 4 is a perspective view illustrating a state where the cutter lid depicted in FIG. 1 is closed.

Subsequently, as illustrated in FIG. 4, the cutter lid 4 is closed with respect to the cutter base 3. Then, an engagement releaser (not depicted) provided with the cutter lid 4 releases the engagement of the slider 8 with the cutter base 3. This allows the slider 8 to move toward the opening 3a under the urging force of the spring 10, so as to return to the initial position (cut completion position) as illustrated in FIGS. 2(b) and 3(d).

Here, the blade member 12 moves toward the opening 3a, so as to come into contact with the glass fiber 2a of the optical fiber 2, thereby incising and cutting the glass fiber 2a.

Figure 5:
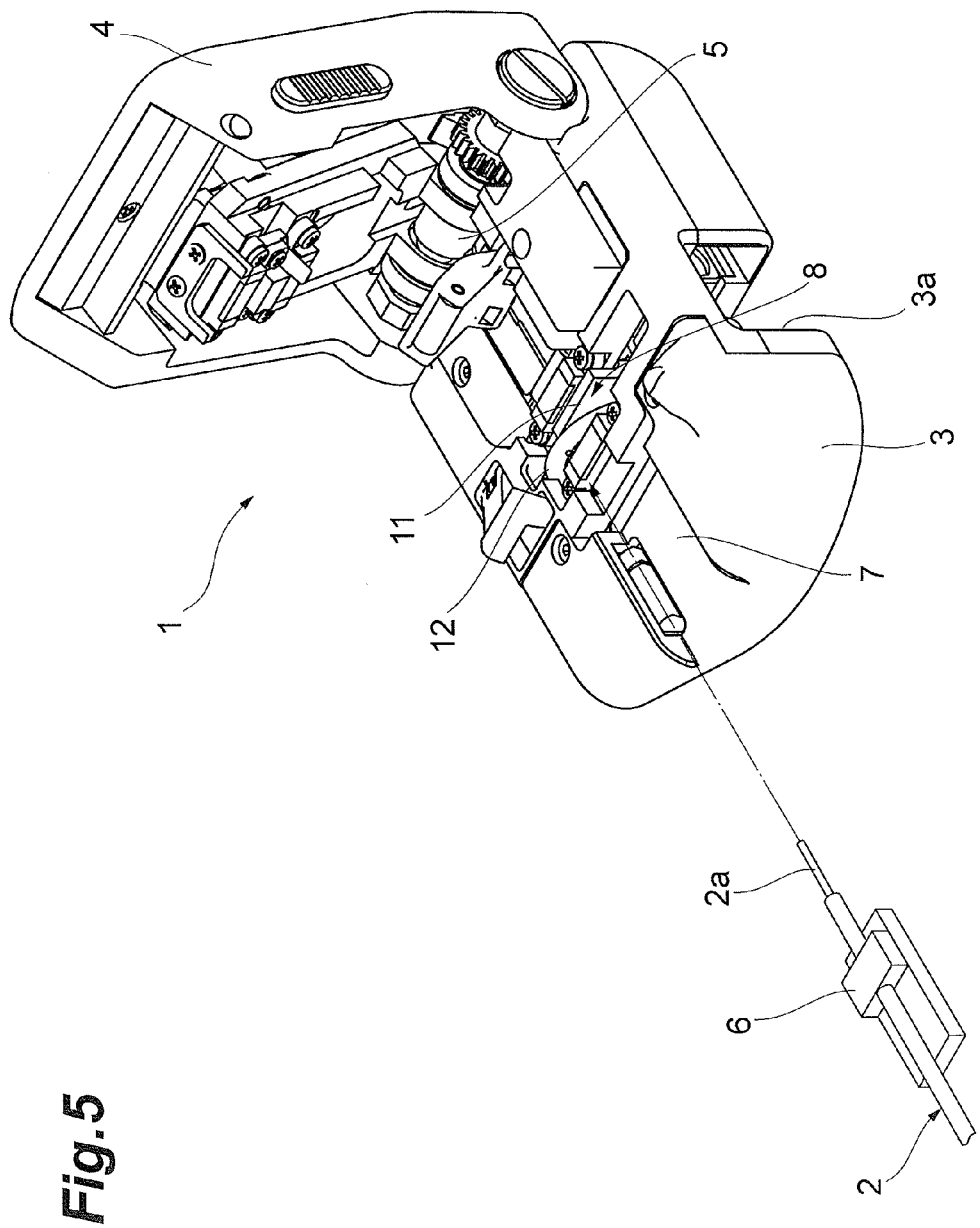
FIG. 5 is a perspective view illustrating a state where the cutter lid is opened more than that in the optical fiber cutter depicted in FIG. 1.

The optical fiber cutter 1 of this embodiment has a function to switch the opening angle of the cutter lid 4 with respect to the cutter base 3 (hereinafter simply referred to as opening angle of the cutter lid 4). Specifically, the opening angle of the cutter lid 4 is set to a first angle (35° here) illustrated in FIG. 1 or a second angle (70° here) illustrated in FIG. 5 greater than the first angle.

A switching plate 15 is attached to a rear end part of the cutter base 3 as illustrated in FIGS. 6 and 7. As illustrated in FIGS. 6 to 9, a switcher 16 is provided on the outer surface side of the switching plate 15. As illustrated in FIGS. 8 and 9, a stopper 17 having a tilted surface 17a sloping to the upper side of the switching plate 15 is provided on the inner surface side of the switching plate 15.

The stopper 17 is integrated with the switcher 16 through a window 15a formed in the switching plate 15. That is, the stopper 17 is adapted to operate in conjunction with the switcher 16. The window 15a is formed into a slit so as to extend longitudinally of the switching plate 15. The switcher 16 and the stopper 17 are movable widthwise of the cutter base 3 along the slit-shaped window 15a.

The switcher 16 is switchable between a first position (see FIGS. 6 and 8) and a second position (see FIGS. 7 and 9). The first position is located closer to the center of the switching plate 15 than is the second position. Here, the first position is a position for causing the cutter lid 4 to have an opening angle of 35° (see FIGS. 1 and 6), while the second position is a position for causing the cutter lid 4 to have an opening angle of 70° (see FIGS. 5 and 7).

Figure 10:
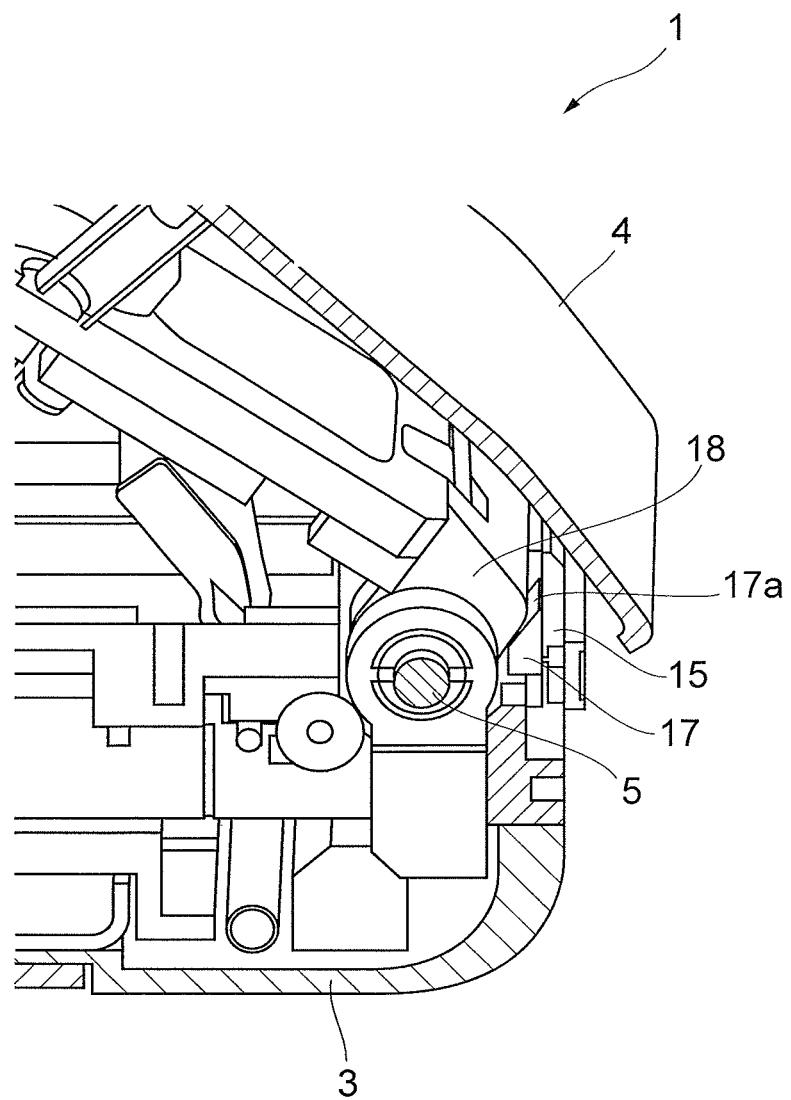
FIG. 10 is a sectional view of a rear part of the optical fiber cutter illustrated in FIG. 6.

When the switcher 16 is at the first position, opening the cutter lid 4 allows an abutment 18 provided at the rear end part of the cutter lid 4 to engage (abut) the tilted surface 17a of the stopper 17, as illustrated in FIG. 10. Hence, the stopper 17 restricts the opening of the cutter lid 4, so as to prohibit the cutter lid 4 from opening more, whereby the opening angle of the cutter lid 4 is held at 35°.

Figure 11:
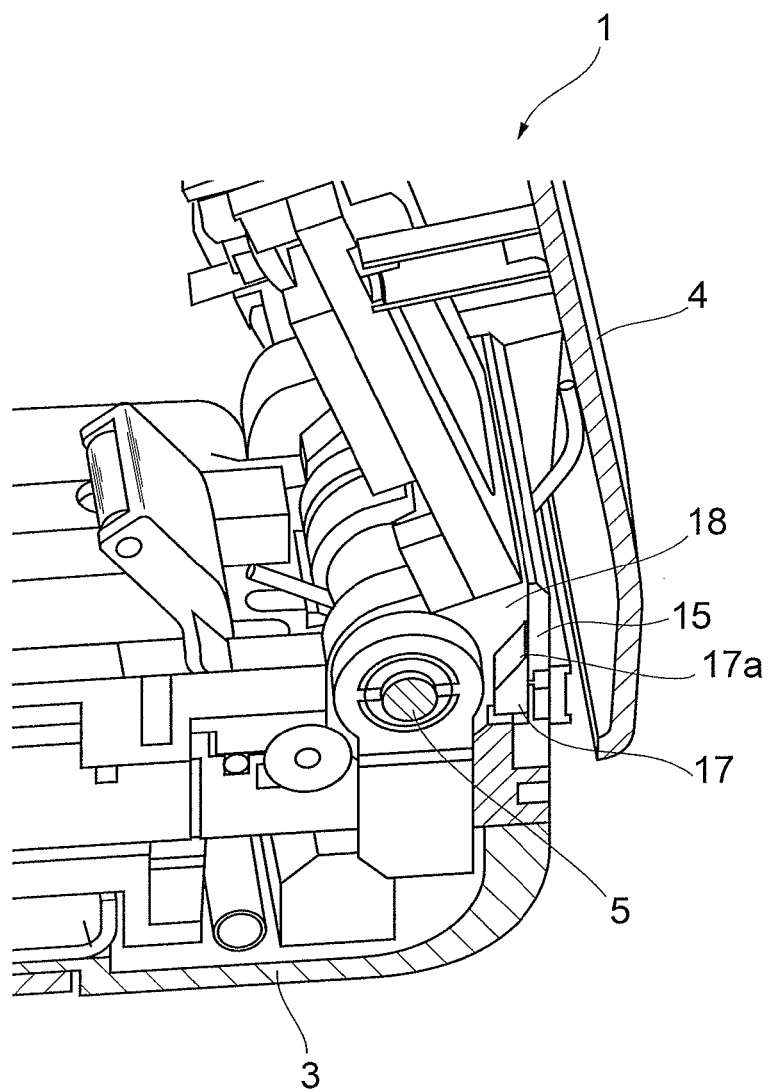
FIG. 11 is a sectional view of a rear part of the optical fiber cutter illustrated in FIG. 7.

When the switcher 16 is switched from the first position to the second position, by contrast, the engagement between the abutment 18 and the tilted surface 17a of the stopper 17 is released, so that the abutment 18 butts against the switching plate 15, whereby the opening angle of the cutter lid 4 is held at 70°, as illustrated in FIG. 11.

In the foregoing, the switching plate 15, switcher 16, stopper 17, and abutment 18 constitute opening angle switching means for switching the opening angle of the cutter lid 4 with respect to the cutter base 3.

When cutting the optical fiber 2 with the optical fiber cutter 1 held with one hand here, setting the switcher 16 at the first position makes the cutter lid 4 have a smaller opening angle of 35°. This makes it easier for the hand holding the optical fiber cutter 1 to close the cutter lid 4.

When performing the operation with the optical fiber cutter 1 held with one hand, the fiber holder 6 holding the optical fiber 2 is set into the holder guide part 7 of the cutter base 3 with the other hand. Here, the fiber holder 6 is set into the holder guide part 7 not from above the optical fiber cutter 1 but from the front or beside the optical fiber cutter 1, whereby there is no trouble in particular even when the cutter lid 4 has the smaller opening angle of 35°.

When cutting the optical fiber 2 with the optical fiber cutter 1 mounted on a workbench, by contrast, setting the switcher 16 at the second position makes the cutter lid 4 have a larger opening angle of 70°.

When the optical fiber cutter 1 is mounted on a workbench, the fiber holder 6 is set into the holder guide part 7 from above the optical fiber cutter 1. Therefore, letting the cutter lid 4 have a larger angle of 70° makes it easier for the fiber holder 6 to be set into the holder guide part 7.

Figure 12:
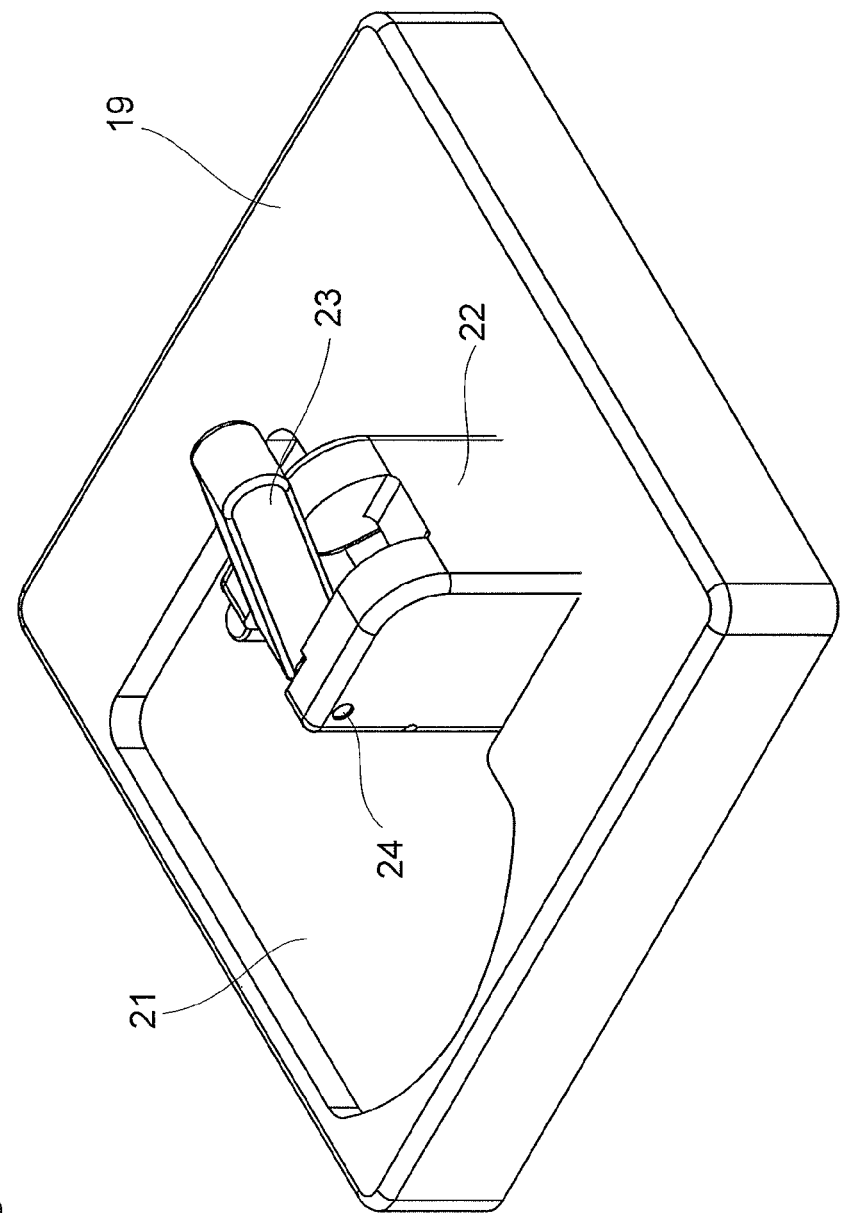
FIG. 12 is a perspective view illustrating a base attachment in which the optical fiber cutter depicted in FIG. 5 is set.

When performing the operation with the optical fiber cutter 1 mounted on the workbench, a base attachment 19 for setting the optical fiber cutter 1 therein is used as illustrated in FIG. 12. The base attachment 19 is a component which constitutes an optical fiber cutter unit 20 (see FIG. 13) together with the optical fiber cutter 1.

Figure 13:
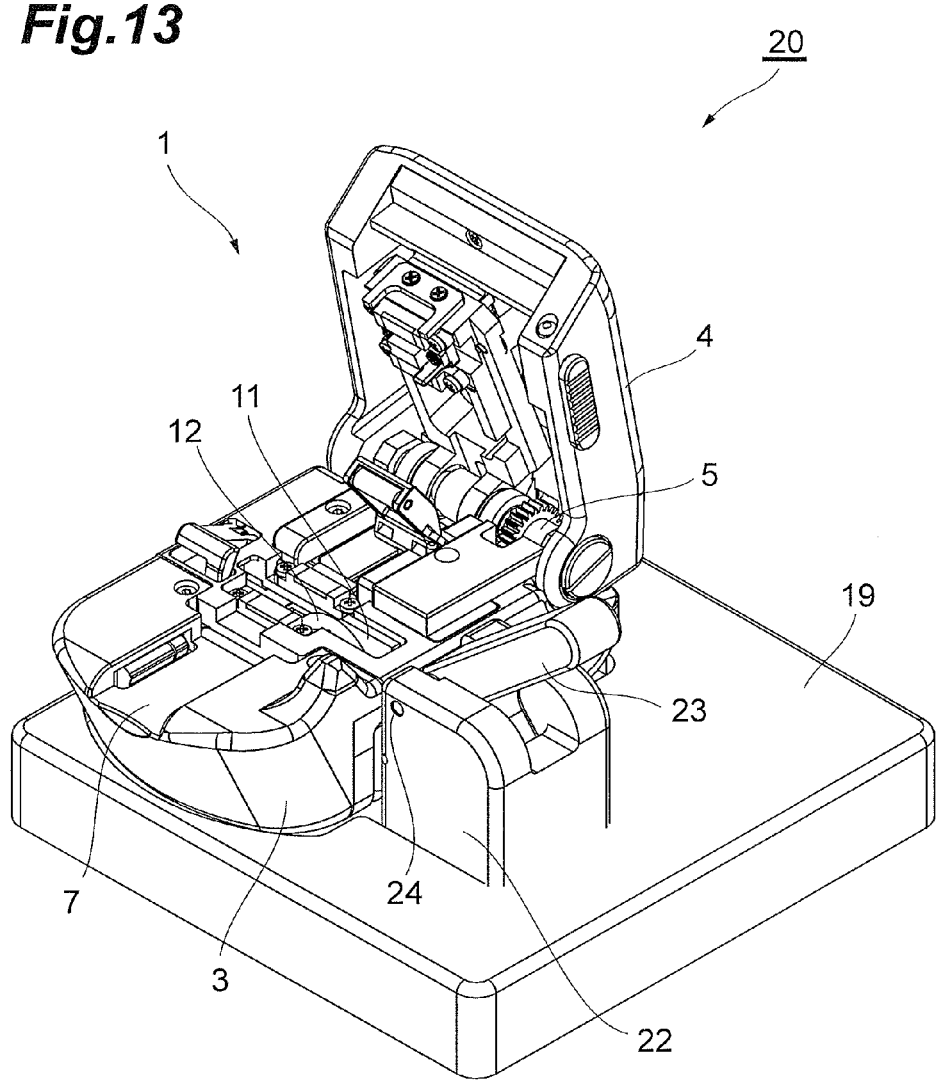
FIG. 13 is a perspective view illustrating a state where the optical fiber cutter depicted in FIG. 5 is set in the base attachment.

The base attachment 19 is formed with a depression 21 for positioning and containing the optical fiber cutter 1. This stabilizes the posture of the optical fiber cutter 1 when the optical fiber cutter 1 is set to the base attachment 19 as illustrated in FIG. 13, which makes the operation further easier to perform.

A support projection 22 projects from a part of the base attachment 19 adjacent to the depression 21. A push lever 23 for pushing the slider 8 of the optical fiber cutter 1 in from the initial position (mentioned above) is rotatably supported by the support projection 22 with a support pin 24.

Figure 14:
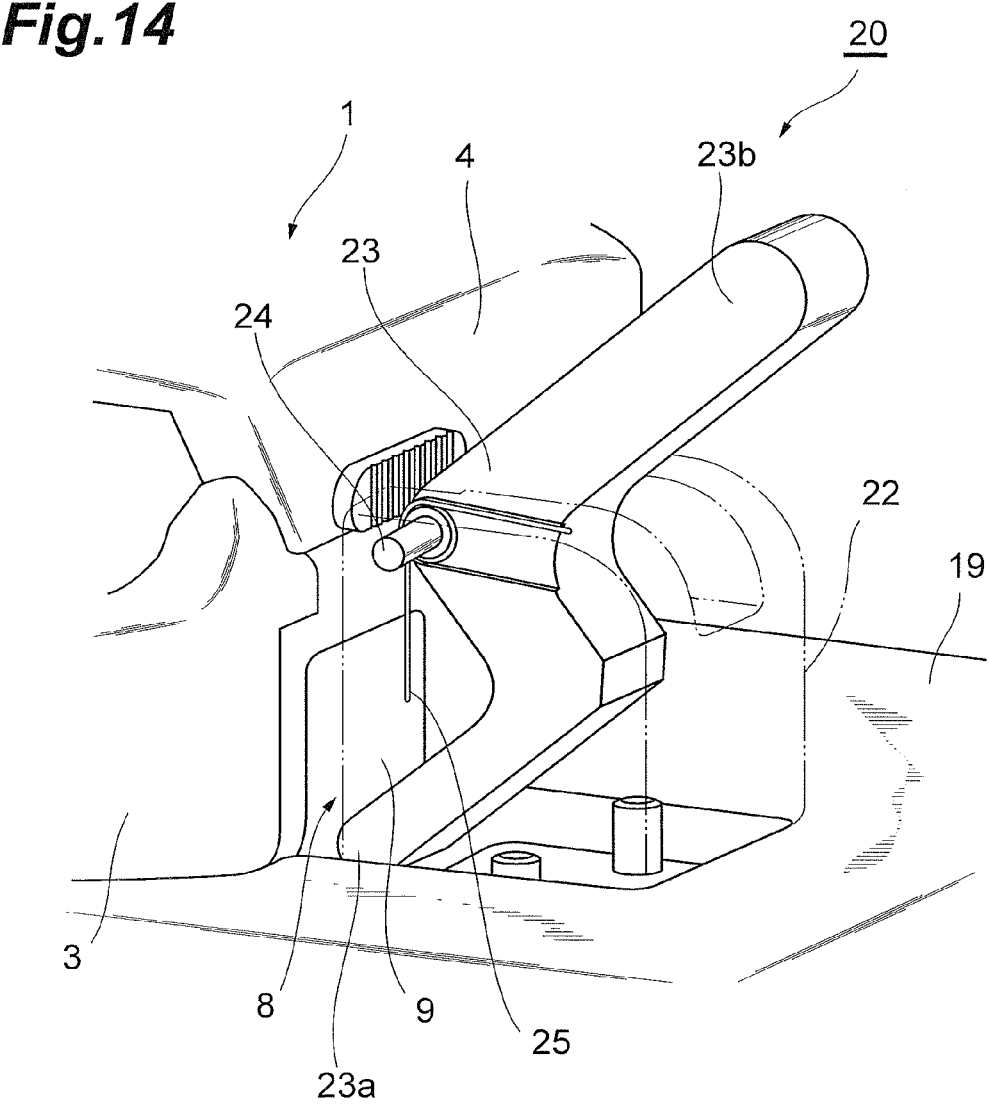
FIG. 14 is a perspective view illustrating a support structure for a push lever depicted in FIG. 13.

The push lever 23 has a crank shape as illustrated in FIG. 14. One end part of the push lever 23 constitutes a pusher 23a adapted to engage the pushing wall 9 of the slider 8, while the other end part of the push lever 23 constitutes a handle 23b to be held by a hand of an operator. A wound spring 25 for urging the push lever 23 to such a direction that the handle 23b extends upward is attached to the support projection 22.

Figure 15:
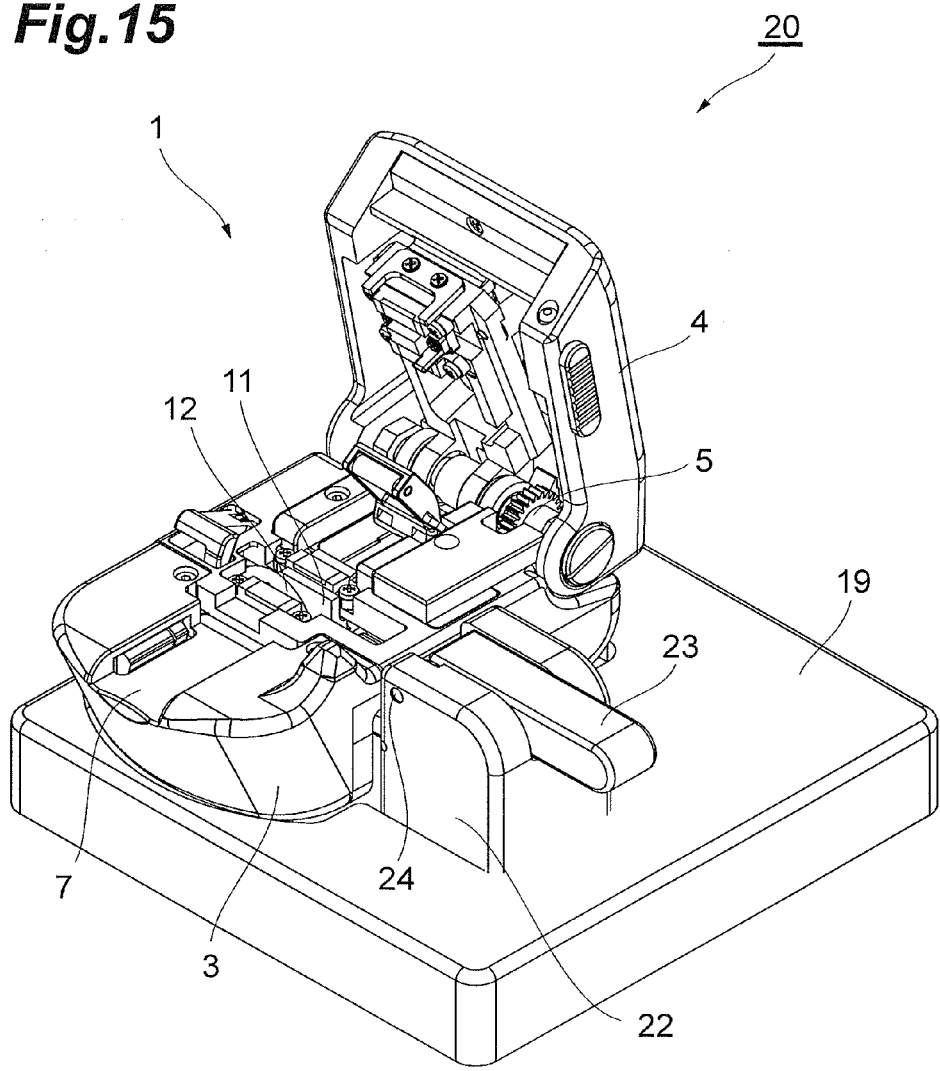
FIG. 15 is a perspective view illustrating a state where a slider is pushed in by the push lever depicted in FIG. 13.
Figure 16:
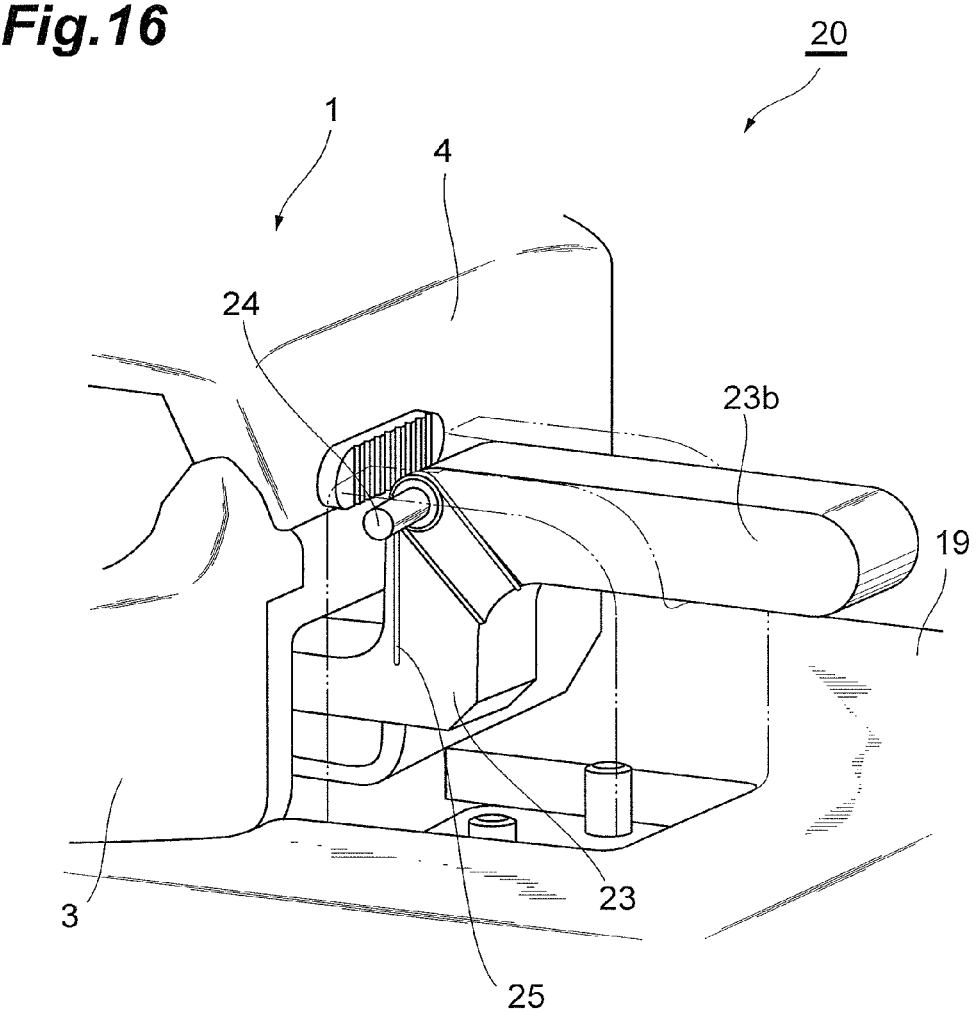
FIG. 16 is a perspective view illustrating a state where the slider is pushed in by the push lever depicted in FIG. 14.

Pushing down the handle 23b of the push lever 23 against the urging force of the wound spring 25 from a state where the push lever 23 is at a normal position as illustrated in FIGS. 15 and 16 allows the pusher 23a of the push lever 23 to push the slider 8 in. Then, the slider 8 moves away from the opening 3a against the urging force of the spring 10, so as to reach the cut start position (mentioned above).

Since the opening angle of the cutter lid 4 is made switchable between two stages as mentioned above, this embodiment can improve workability when cutting the optical fiber 2 with the optical fiber cutter 1 either held with a hand or placed on a workbench.

Specifically, when cutting the optical fiber 2 with the optical fiber cutter 1 held with one hand, setting the opening angle of the cutter lid 4 at the first angle allows the hand holding the optical fiber cutter 1 to close the cutter lid 4 easily. When cutting the optical fiber 2 with the optical fiber cutter 1 placed on a workbench, by contrast, setting the opening angle of the cutter lid 4 at the second angle larger than the first angle makes it easy for the fiber holder 6 to be set into the holder guide part 7 of the cutter base 3 from above the optical fiber cutter 1.

Since the base attachment 19 for use when cutting the optical fiber 2 with the optical fiber cutter 1 placed on a workbench is provided with the push lever 23 for pushing the slider 8 of the optical fiber cutter 1 in, it is unnecessary for the operator to push the slider 8 in manually from above or beside the optical fiber cutter 1. This can achieve better workability.

The present invention is not limited to the above-mentioned embodiment. For example, the opening angle of the cutter lid 4, which is switchable between two stages in the above-mentioned embodiment, may be made switchable among three or more stages by forming the stopper 17 of the switching plate 15 with steps.

While the above-mentioned embodiment provides the base attachment 19 with the depression 21 for positioning and containing the optical fiber cutter 1, the optical fiber cutter 1 may be fastened to the base attachment 19 with screws instead, for example.

While the above-mentioned embodiment sets the optical fiber cutter 1 to the base attachment 19 when the opening angle of the cutter lid 4 is at the second angle, the optical fiber cutter 1 may be set to the base attachment 19 regardless of the opening angle of the cutter lid 4, so as to cut the optical fiber 2.

While the base attachment 19 is used for setting the optical fiber cutter 1 in the above-mentioned embodiment, accompanying tools such as a remover (coating removing device) may be made settable to the base attachment in addition to the optical fiber cutter 1. After removing the coating from the optical fiber, the optical fiber must be cleaned, for which cleaning tools may be made settable to the base attachment. Here, a space for placing alcohol, Bemcot, and cotton swabs may be secured in the base attachment, and a dust box may be made attachable to the base attachment.

REFERENCE SIGNS LIST

1 . . . optical fiber cutter; 2 . . . optical fiber; 3 . . . cutter base; 4 . . . cutter lid; 7 . . . holder guide part (fiber guide part); 8 . . . slider; 12 . . . blade member; 15 . . . switching plate (opening angle switching means); 16 . . . switcher (opening angle switching means); 17 . . . stopper (opening angle switching means); 18 . . . abutment (opening angle switching means); 19 . . . base attachment; 20 . . . optical fiber cutter unit; 23 . . . push lever

The invention claimed is:

1. An optical fiber cutter for cutting an optical fiber, the optical fiber cutter comprising:
   a cutter base having a holder guide part for positioning a fiber holder holding the optical fiber;
   a slider, movably attached to the cutter base, having a blade member for incising the optical fiber;
   a cutter lid attached to the cutter base, the cutter lid is moveable between an open and closed position; and
   an opening angle switching means for switching an opening angle of the cutter lid with respect to the cutter base,
   wherein the opening angle switching means has a switcher provided with the cutter base, a stopper adapted to operate in conjunction with the switcher so as to engage the cutter lid when the switcher is at a predetermined position and a switching plate arranged at a rear end part of the cutter base,
   wherein the switcher and the stopper are attached to the switching plate so as to be movable together widthwise of the cutter base,
   wherein the switcher is provided on the outer surface side of the switching plate and is adapted to be switchable between a first position for causing the cutter lid to have a first opening angle and a second position for causing the cutter lid to have a second opening angle,
   wherein the stopper is provided on the inner surface side of the switching plate and having a tilted surface,
   wherein, when the switcher is in the first position, an abutment provided with the cutter lid engages with the tilted surface of the stopper to hold the opening angle of the cutter lid at the first angle;
   wherein, when the switcher is in the second position, the abutment and the tilted surface of the stopper disengage, the abutment butts against the switching plate and the opening angle of the cutter lid is held at the second angle, and
   wherein a rear end part side of the cutter lid has an inverse U-shape when viewed from the rear so that contact with the opening angle switching means provided on the cutter base is prevented when the cutter lid moves from the closed position to the open position.

2. An optical fiber cutter unit having an optical fiber cutter and a base attachment for setting the optical fiber cutter, the optical fiber cutter comprising:
   a cutter base having a holder guide part for positioning a fiber holder holding the optical fiber;
   a slider, movably attached to the cutter base, having a blade member for incising the optical fiber;
   a cutter lid attached to the cutter base, the cutter lid is moveable between an open and closed position; and
   an opening angle switching means for switching an opening angle of the cutter lid with respect to the cutter base,
   wherein the opening angle switching means has a switcher provided with the cutter base, a stopper adapted to operate in conjunction with the switcher so as to engage the cutter lid when the switcher is at a predetermined position and a switching plate arranged at a rear end part of the cutter base,
   wherein the switcher and the stopper are attached to the switching plate so as to be movable together widthwise of the cutter base,
   wherein the switcher is provided on the outer surface side of the switching plate and is adapted to be switchable between a first position for causing the cutter lid to have a first opening angle and a second position for causing the cutter lid to have a second opening angle,
   wherein the stopper is provided on the inner surface side of the switching plate and having a tilted surface,
   wherein, when the switcher is in the first position, an abutment provided with the cutter lid engages with the tilted surface of the stopper to hold the opening angle of the cutter lid at the first angle;
   wherein, when the switcher is in the second position, the abutment and the tilted surface of the stopper disengage, the abutment butts against the switching plate and the opening angle of the cutter lid is held at the second angle, and
   wherein a rear end part side of the cutter lid has an inverse U-shape when viewed from the rear so that contact with the opening angle switching means provided on the cutter base is prevented when the cutter lid moves from the closed position to the open position.

3. An optical fiber cutter unit according to claim 2, wherein the base attachment is provided with a push lever for pushing the slider in from an initial position.

* * * * *